(12) United States Patent
Bentley

(10) Patent No.: US 6,641,446 B1
(45) Date of Patent: Nov. 4, 2003

(54) RESCUE SLED

(76) Inventor: Ronald K. Bentley, 1074 W Thatcher, Quakertown, PA (US) 18951

( * ) Notice: Subject to any disclaimer, the term of this patent is extended or adjusted under 35 U.S.C. 154(b) by 0 days.

(21) Appl. No.: 09/713,059

(22) Filed: Nov. 16, 2000

(51) Int. Cl.[7] .............................. B63C 9/32; B62B 13/00
(52) U.S. Cl. ........................................... 441/82; 280/19
(58) Field of Search .............................. 5/625; 280/18, 280/19; 441/80, 82

(56) References Cited

U.S. PATENT DOCUMENTS

| | | | | | |
|---|---|---|---|---|---|
| 3,133,295 | A | * | 5/1964 | Klingensmith | 441/80 |
| 3,453,000 | A | * | 7/1969 | Asher | 280/18 |
| 3,865,391 | A | * | 2/1975 | Melnick et al. | 280/18 |
| 4,347,635 | A | * | 9/1982 | Eisenhauer | 441/40 |
| 4,556,003 | A | * | 12/1985 | Prade | 441/74 |
| 4,717,362 | A | * | 1/1988 | Kraft | 441/82 |
| 4,871,337 | A | * | 10/1989 | Harris | 441/70 |
| 5,257,953 | A | * | 11/1993 | Gillis | 441/74 |
| 5,354,222 | A | * | 10/1994 | Elias | 441/80 |
| 5,414,883 | A | * | 5/1995 | Fangrow, Jr. | 5/625 |
| 5,421,757 | A | * | 6/1995 | Basiliere | 441/39 |
| 5,473,784 | A | * | 12/1995 | Nixon et al. | 5/625 |
| 5,560,059 | A | * | 10/1996 | McQueen | 5/625 |
| 5,568,662 | A | * | 10/1996 | Gougelet | 5/625 |
| 6,190,222 | B1 | * | 2/2001 | Senger | 441/82 |
| 6,305,305 | B1 | * | 10/2001 | Johnson | 114/65 |
| 6,352,460 | B1 | * | 3/2002 | Eiband et al. | 441/80 |

* cited by examiner

Primary Examiner—S. Joseph Morano
Assistant Examiner—Andrew Wright
(74) Attorney, Agent, or Firm—Zachary T. Wobensmith, III

(57) ABSTRACT

A rescue sled for picking up victims of water or ice accidents and transporting them to safety, which sled can be carried in the back of an ambulance or other vehicle.

3 Claims, 2 Drawing Sheets

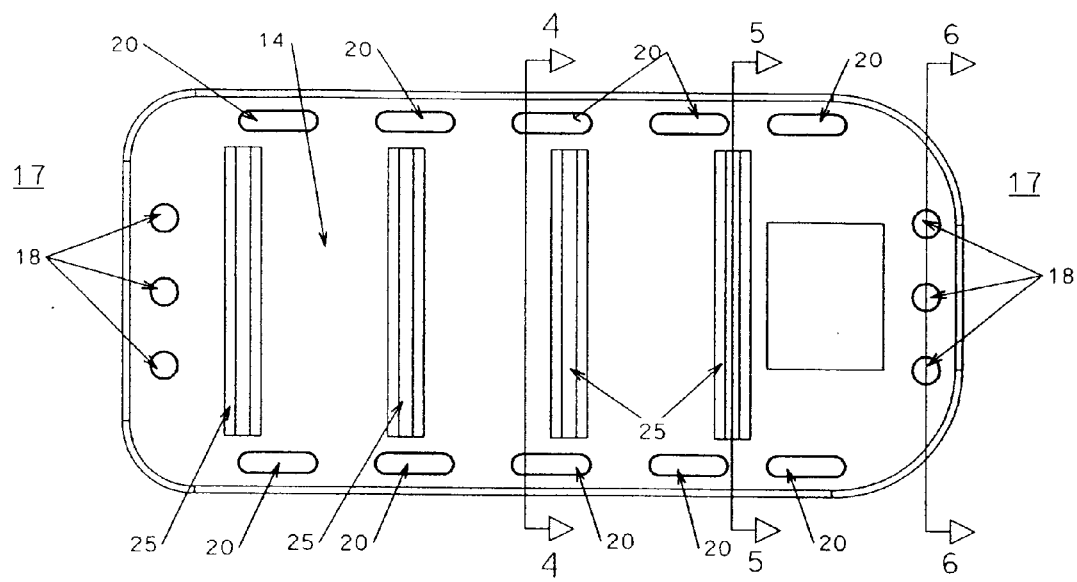
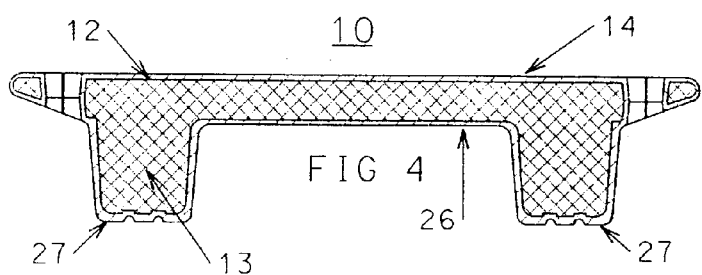
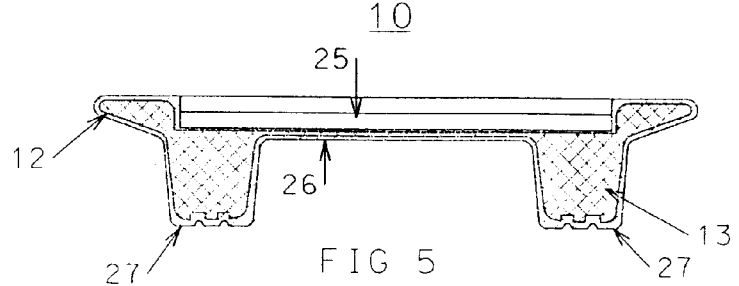
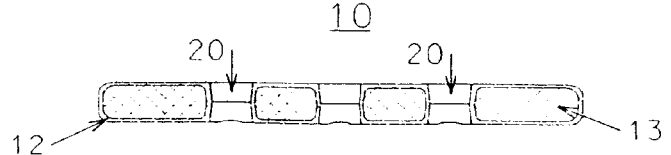

RESCUE SLED

BACKGROUND OF THE INVENTION

1. Field of the Invention

This invention relates to a rescue sled for picking up and transporting persons who may be involved in water and ice accidents, of the type which is buoyant, and can be towed over ice and snow with a person strapped thereon.

2. Description of the Prior Art

Various devices have been proposed as rescue equipment for rescuing persons trapped on thin ice, or stranded on a flooded river or creek. A situation where a person ventures out onto thin ice and breaks through, or is unable to return is common and presents a difficult scenario for rescue personnel. The rescue equipment must be capable of easy movement over the ice, must be easily grasped by the person, and then moved over ice and/or snow to return the victim to safety.

Rescue equipment must be lightweight, it must be easily deployable and capable of supporting a person, useful on ice or water or snow, and be transportable in an ambulance or other rescue vehicle.

Various pieces of equipment have been proposed, such as those shown in the U.S. Patents to Paden et. al. U.S. Pat. No. 2,735,690; Rickenbacker U.S. Pat. No. 4,170,367; Eisenhauer U.S. Pat. No. 4,347,635; Cashmere U.S. Pat. No. 4,561,664; Brooks, Jr. U.S. Pat. No. 4,571,195; Kraft U.S. Pat. No. 4,717,362; Nixon et. al. U.S. Pat. No. 5,473,784; Daouk U.S. Pat. No. 5,499,416; Glydon et. al. U.S. Pat. No. 5,658,179; Ziff U.S. Pat. No. D216,530; Diemond et. al. U.S. Pat. No. D219,463; and Helms U.S. Pat. No. D322,770.

Ice rescue equipment is also offered by Marsars, 17 Terrill Ave., Hamilton, N.J. 08619 but none of the available equipment is useful for the wide variety of situations that rescue personnel face.

The rescue sled of the invention is useful in snow, ice and water rescue operations, is easily transportable and provides many other positive advantages.

SUMMARY OF THE INVENTION

This invention relates to a rescue sled for use by rescue personnel who are involved in ice or water rescue operations for picking up and transporting persons.

The principal object of the invention is to provide a rescue sled for use in picking up and transporting persons.

A further object of the invention is to provide a rescue sled which can support a person on water or ice.

A further object of the invention is to provide a rescue sled that has rungs so that it may be used as a ladder.

A further object of the invention is to provide a rescue sled that can be used in multiples.

A further object of the invention is to provide a rescue sled that can be pulled behind a boat.

A further object of the invention is to provide a rescue sled that can travel over snow.

A further object of the invention is to provide a rescue sled that can be ferried over water.

A further object of the invention is to provide a rescue sled that is easy to make, durable and long lasting in use.

A further object of the invention is to provide a rescue sled that can be deployed by one person.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 3 is a top plan view of the rescue sled of FIG. 1;

FIG. 4 is a vertical sectional view taken approximately on the line 4—4 of FIG. 3.

FIG. 5 is a vertical sectional view taken approximately on the line 5—5 of FIG. 3, and, FIG. 6 is a vertical sectional view taken approximately on the line 6—6 of FIG. 3.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENT

When referring to the preferred embodiment, certain terminology will be utilized for the sake of clarity. Use of such terminology is intended to encompass not only the described embodiment, but also technical equivalents which operate and function in substantially the same way to bring about the same result.

Figure 1:
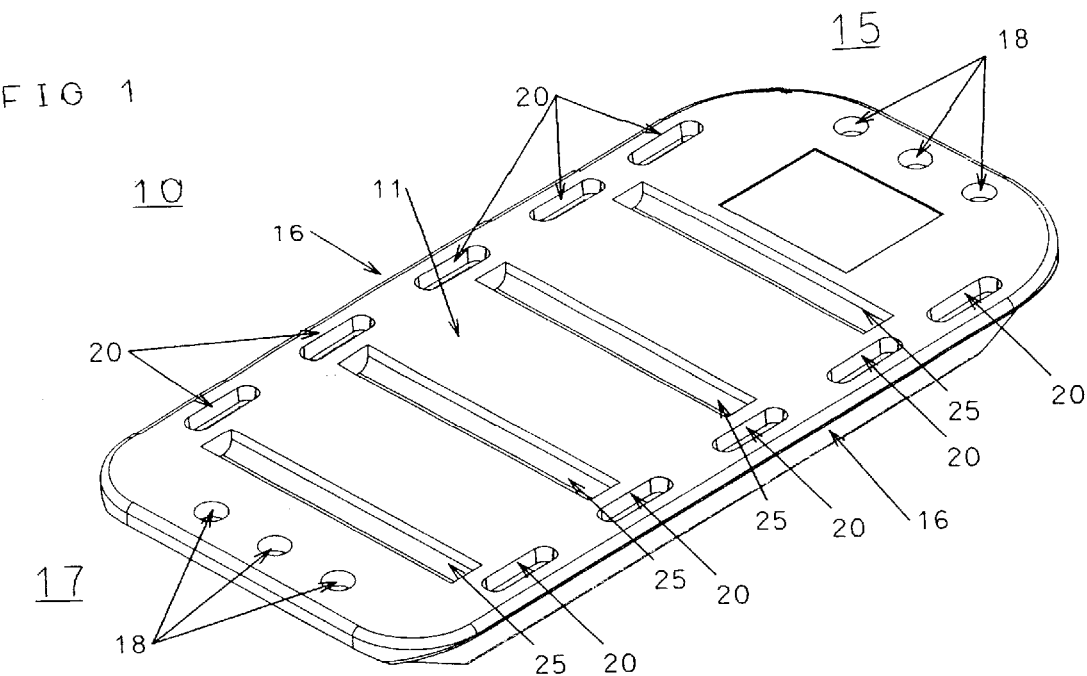
FIG. 1 is a top perspective view of the rescue sled of the invention.
Figure 2:
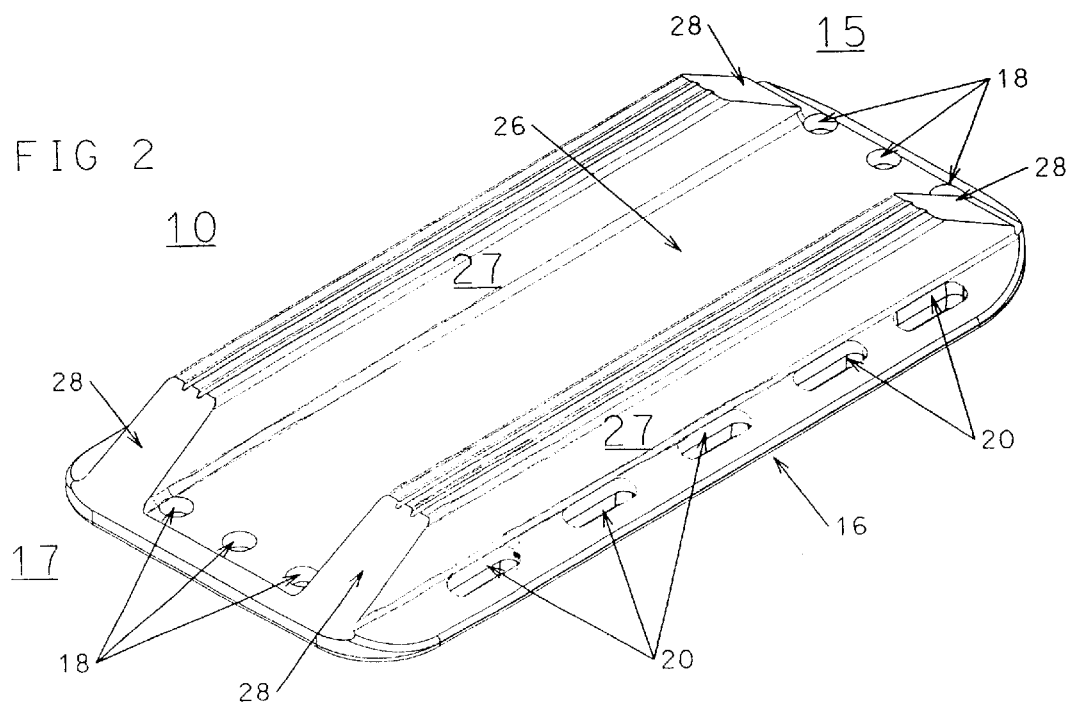
FIG. 2 is a bottom perspective view of the rescue sled of FIG. 1.

Referring now more particularly to FIGS. 1–6 of the drawings, the rescue sled 10 is therein illustrated.

The sled 10 includes a body of multipiece molded construction with an outer skin 12 of polyethylene, filled with plastic foam 13, preferably polyurethane foam, which imparts buoyancy to the sled.

The sled 10 is of rectangular configuration with a deck 14, a rounded front end 15, which is prow shaped, with straight sides 16, and a rear end 17, which is also rounded, but to a lesser degree than front end 15.

The sled 10 has a plurality of holes 18 therein adjacent the front end 15 and rear end 17, three being illustrated, which can receive a rope or ropes (not shown) for towing or to fasten to another sled (not shown).

The sled 10 adjacent the sides 16 is provided with a plurality of rectangular holes 20 on each side, four being illustrated. The holes 20 can receive straps (not shown), which can be used to secure a person (not shown) to the sled 10 for transport.

The sled 10 has a plurality of transversly extending hand holds 25, which are in the deck 14, four being shown, which permit the sled to be used as a ladder.

The sled 10 has a bottom 26 which has a pair of spaced ribbed runners 27 extending longitudinally, which are rectangular in shape with sloped ends 28, to assist the sled in traveling over ice or snow.

In use the sled 10 can be slid on the runners 27 across snow or ice, and to the location of the person to be rescued (not shown). If the ice cannot support the person's weight then the person can grab onto one of the hand holds 25, and climb onto the deck 14 of the sled 10. The holes 18 may have a rope or ropes (not shown) therein to enable rescue personnel to pull the sled 10 and person (not shown) to safety, with the sled capable of supporting the person whether the sled is in the water, on the ice or on snow. If the person is stranded on an island, or a vehicle in the water, the sled can be ferried over the water to the person and then returned to safety.

It will thus be apparent that the objects of the invention have been achieved.

I claim:

1. A rescue sled for use in retrieving and transporting persons which comprises, a rectangular body of multipiece molded construction having a deck and a bottom, said bottom having a pair of spaced ribbed runners extending longitudinally, said body having a rounded prow shaped front end and a rounded rear end connected by straight sides, a plurality of spaced holes adjacent said front and said rear ends to receive at least one rope for moving said sled, a plurality of spaced holes adjacent said sides to receive straps to secure a person to said sled, and a plurality of handholds in said deck extending transversely across substantially the entire deck to assist a person in climbing aboard.

2. A rescue sled as defined in claim 1 in which said body has an outer skin of plastic and an inner filling of foam plastic.

3. A rescue sled as defined in claim 2 in which said outer skin is of polyethylene and said foam filling is of polyurethane.

* * * * *